United States Patent
Teraoka et al.

(10) Patent No.: US 9,428,030 B2
(45) Date of Patent: Aug. 30, 2016

(54) SHOCK ABSORBER

(71) Applicant: KAYABA INDUSTRY CO., LTD., Tokyo (JP)

(72) Inventors: Takashi Teraoka, Gifu (JP); Tatsuya Masamura, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/778,326

(22) PCT Filed: Mar. 20, 2014

(86) PCT No.: PCT/JP2014/057901
§ 371 (c)(1),
(2) Date: Sep. 18, 2015

(87) PCT Pub. No.: WO2014/148635
PCT Pub. Date: Sep. 25, 2014

(65) Prior Publication Data
US 2016/0059663 A1 Mar. 3, 2016

(30) Foreign Application Priority Data
Mar. 22, 2013 (JP) .................. 2013-060603

(51) Int. Cl.
*B60G 17/08* (2006.01)
*F16F 9/512* (2006.01)
*F16F 9/18* (2006.01)
*B60G 13/08* (2006.01)

(52) U.S. Cl.
CPC .............. *B60G 17/08* (2013.01); *B60G 13/08* (2013.01); *F16F 9/187* (2013.01); *F16F 9/5126* (2013.01); *B60G 2202/24* (2013.01); *B60G 2500/114* (2013.01); *B60G 2600/182* (2013.01); *F16F 2222/12* (2013.01); *F16F 2228/066* (2013.01)

(58) Field of Classification Search
CPC .............................. B60G 17/08; B60G 13/08
See application file for complete search history.

(56) References Cited

U.S. PATENT DOCUMENTS

| | | | | |
|---|---|---|---|---|
| 2012/0048665 A1* | 3/2012 | Marking | ................ | B60G 13/08 188/287 |
| 2015/0047934 A1* | 2/2015 | Mallin | .................... | F16F 9/066 188/269 |
| 2015/0165861 A1* | 6/2015 | Allen | .................... | B60G 17/08 267/64.26 |

FOREIGN PATENT DOCUMENTS

| | | |
|---|---|---|
| EP | 2103835 A1 | 9/2009 |
| JP | 2009-222136 A | 10/2009 |

* cited by examiner

Primary Examiner — Vishal Sahni
(74) Attorney, Agent, or Firm — Rabin & Berdo, P.C.

(57) ABSTRACT

A shock absorber includes a suction passage allowing flow only from a reservoir towards a pressure side chamber, a rectifying passage allowing flow only from the pressure side chamber towards an expansion side chamber, and a damping force variable valve allowing flow only from the expansion side chamber towards the reservoir. Large, and small and outer peripheral chambers in a bottom housing sandwich a free piston. The small chamber communicates the outer peripheral chamber with the expansion side chamber. The large chamber communicates with the pressure side chamber through first and second valves. During a contraction in which a piston moves downward, even in a uniflow-type shock absorber in which pressure in the expansion side chamber and the pressure side chamber become equal, the free piston can move downward due to a difference in pressure-receiving areas. Even if a stretching speed reaches a high range, the first and second valves are opened, and damping force is reduced.

5 Claims, 5 Drawing Sheets

SHOCK ABSORBER

TECHNICAL FIELD

The present invention relates to improvement of a shock absorber.

BACKGROUND ART

A shock absorber includes a cylinder, a piston, a piston rod, an expansion side chamber, a pressure side chamber, an intermediate pipe, an outer pipe, a suction passage, a rectifying passage, and a damping force variable valve. The piston is slidably inserted into the cylinder. The piston rod is inserted into the cylinder to couple to the piston. The expansion side chamber and the pressure side chamber are defined by the piston. The intermediate pipe covers the outer periphery of the cylinder to form a discharge passage with the cylinder. The outer pipe covers the outer periphery of the intermediate pipe to form a reservoir with the intermediate pipe. The suction passage allows only a flow of operation oil from the reservoir toward the pressure side chamber. The rectifying passage is disposed in the piston, and allows only a flow of operation oil from the pressure side chamber toward the expansion side chamber. The damping force variable valve is disposed between the discharge passage and the reservoir.

During expansion and contraction, the shock absorber causes the actions of the rectifying passage and the suction passage such that the operation oil flows out to the reservoir from the inside of the cylinder through the discharge passage. Adjusting the resistance provided to this flow of the operation oil in the damping force variable valve allows adjusting the damping force generated by the shock absorber (for example, see JP2009-222136A).

Thus, the shock absorber allows adjusting the damping force. This allows generating a damping force appropriate for vibration of a vehicle body, so as to improve the ride comfort in the vehicle. The shock absorber having the damping force variable valve outside the cylinder has an advantage that ensures a stroke length and allows maintaining the mountability on a vehicle compared with a shock absorber having the damping force variable valve inside the piston.

SUMMARY OF INVENTION

A solenoid is used to adjust the damping force of the shock absorber having the damping force variable valve. The thrust provided by the solenoid to a pilot valve for controlling the valve opening pressure of the damping force variable valve is adjusted to adjust the resistance provided to the flow of the operation oil by the damping force variable valve.

To generate the damping force appropriate for reducing the vibration of the vehicle in the shock absorber, an electronic control device referred to as an Electronic Control Unit (ECU) obtains an appropriate damping force from vibration information, which is detected by various sensors, of the vehicle body of the vehicle to transmit a control command to a driver that drives the solenoid.

At present, the frequency of the vibration of the vehicle body to allow vibration damping by adjusting the damping force by the shock absorber is limited to the upper limit of around several Hz by the responsiveness of the damping force variable valve and the arithmetic processing speed of the ECU. Accordingly, it is difficult to reduce the vibration at a frequency equal to or more than the upper limit.

However, the frequency of the vehicle body vibration that determines ride comfort in the vehicle is a higher frequency than the frequency band that allows vibration damping. A conventional shock absorber does not allow reducing the vibration at this high frequency, and thus it is requested to improve the ride comfort in the vehicle. Obtaining a sufficient vibration reduction effect in the case where the stretching speed of the shock absorber is high during input of a high-frequency vibration allows further improving the ride comfort in the vehicle.

An object of the present invention is to provide a shock absorber that allows improving the ride comfort in the vehicle during high-frequency input and allows maintaining the vibration reduction effect even when the stretching speed is high.

According to an aspect of the present invention, a shock absorber includes: a cylinder; a piston slidably inserted into the cylinder, the piston defining an expansion side chamber and an pressure side chamber inside the cylinder; a reservoir; a suction passage that allows only a flow of liquid from the reservoir toward the pressure side chamber; a rectifying passage that allows only a flow of liquid from the pressure side chamber toward the expansion side chamber; a damping force adjusting unit that allows only a flow of liquid from the expansion side chamber toward the reservoir, the damping force adjusting unit being configured to change resistance provided to the flow of liquid; a housing that includes a pressure chamber including a small-cross-sectional-area portion and a large-cross-sectional-area portion; a free piston that includes: a small-piston portion slidably inserted into the small-cross-sectional-area portion of the pressure chamber; and a large-piston portion slidably inserted into the large-cross-sectional-area portion of the pressure chamber, the free piston defining a small chamber inside the small-cross-sectional-area portion using the small-piston portion, the free piston defining an outer peripheral chamber in an outer periphery of the small-piston portion inside the large-cross-sectional-area portion, the free piston defining a large chamber inside the large-cross-sectional-area portion using the large-piston portion; a spring element configured to position the free piston in a center position of the pressure chamber, the spring element being configured to generate a biasing force to reduce displacement of the free piston from the center position; an expansion side passage that causes one of the small chamber and the outer peripheral chamber to communicate with the expansion side chamber; a pressure-side first passage and a pressure-side second passage that communicate between the large chamber and the pressure side chamber; a first valve disposed in the pressure-side first passage, the first valve being configured to allow only a flow of liquid from the large chamber toward the pressure side chamber while providing resistance to the flow; and a second valve disposed in the pressure-side second passage, the second valve being configured to allow only a flow of liquid from the pressure side chamber toward the large chamber while providing resistance of the flow.

DESCRIPTION OF EMBODIMENTS

A shock absorber according to an embodiment of the present invention will be described with reference to the drawings. In the following, the upper side is described as "above" and the lower side is described as "below" in the respective drawings other than the attenuation characteristic diagram.

Figure 1:
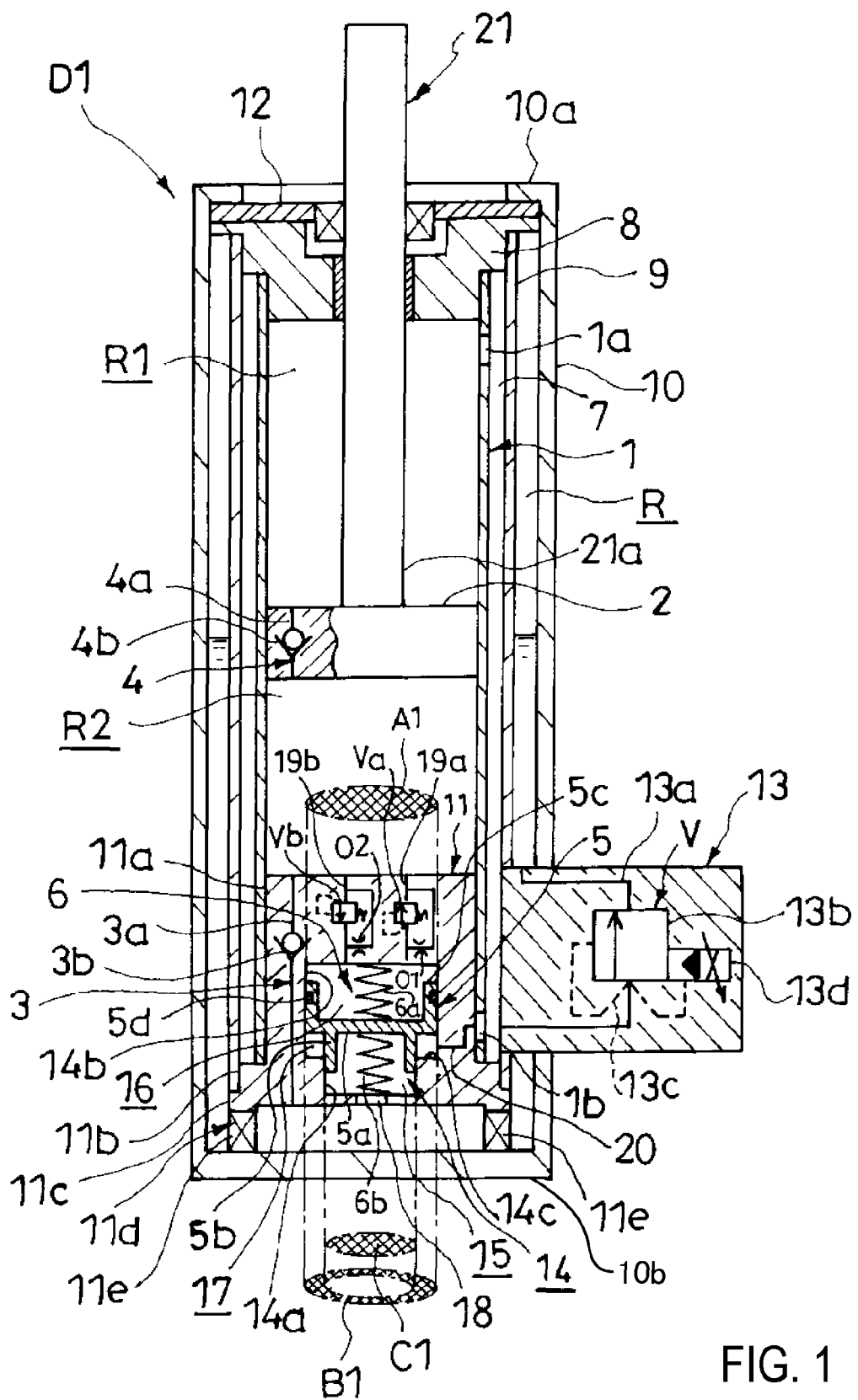
FIG. 1 is a vertical cross-sectional view of a shock absorber according to an embodiment.

As illustrated in FIG. 1, a shock absorber D1 includes a cylinder 1, a piston 2, a reservoir R, a suction passage 3, a rectifying passage 4, a damping force variable valve V, a bottom member 11, a free piston 5, a spring element 6, an expansion side passage 20, a pressure-side first passage 19a, a pressure-side second passage 19b, a first valve Va, and a second valve Vb.

The piston 2 is slidably inserted into the cylinder 1, and defines the expansion side chamber R1 and the pressure side chamber R2 inside the cylinder 1. The suction passage 3 allows only a flow of liquid from the reservoir R toward the pressure side chamber R2. The rectifying passage 4 allows only a flow of liquid from the pressure side chamber R2 toward the expansion side chamber R1. The damping force variable valve V is a damping force adjusting unit that allows only a flow of liquid from the expansion side chamber R1 toward the reservoir R and allows changing the resistance provided to the flow of liquid. The bottom member 11 is a housing that includes a pressure chamber 14, which includes a small-cross-sectional-area portion 14a and a large-cross-sectional-area portion 14b. The free piston 5 includes a small-piston portion 5b, which is slidably inserted into the small-cross-sectional-area portion 14a of the pressure chamber 14, and a large-piston portion 5c, which is slidably inserted into the large-cross-sectional-area portion 14b of the pressure chamber 14. The free piston 5 defines a small chamber 15 using the small-piston portion 5b inside the small-cross-sectional-area portion 14a, defines an outer peripheral chamber 17 in the outer periphery of the small-piston portion 5b inside the large-cross-sectional-area portion 14b, and defines a large chamber 16 using the large-piston portion 5c inside the large-cross-sectional-area portion 14b.

The spring element 6 positions the free piston 5 in the center position of the pressure chamber 14 and generates a biasing force that reduces the displacement of the free piston 5 from the center position. The expansion side passage 20 causes one of the small chamber 15 and the outer peripheral chamber 17, that is, the outer peripheral chamber 17 in the example described in FIG. 1 to communicate with the expansion side chamber R1. The pressure-side first passage 19a and the pressure-side second passage 19b communicate between the large chamber 16 and the pressure side chamber R2. The first valve Va is disposed in the pressure-side first passage 19a to allow only a flow of liquid from the large chamber 16 toward the pressure side chamber R2 and provides resistance to the flow of liquid. The second valve Vb is disposed in the pressure-side second passage 19b to allow only a flow of liquid from the pressure side chamber R2 toward the large chamber 16 and provides resistance to the flow of liquid.

The shock absorber D1 includes a piston rod 21, which is movably inserted through the inside of the cylinder 1. The piston rod 21 has: one end 21a coupled to the piston 2; and an upper end as the other end slidably journaled by a ring-shaped rod guide 8, which seals the upper end of the cylinder 1, so as to protrude outward. Furthermore, the shock absorber D1 includes an intermediate pipe 9 and an outer pipe 10. The intermediate pipe 9 covers the outer periphery of the cylinder 1 to form a discharge passage 7, which communicates between the expansion side chamber R1 and the reservoir R, with the cylinder 1. The outer pipe 10 in a bottomed cylindrical shape covers the outer periphery of the intermediate pipe 9 to form the reservoir R with the intermediate pipe 9. The damping force variable valve V is disposed between the discharge passage 7 and the reservoir R. The lower ends of the cylinder 1 and the intermediate pipe 9 are sealed by the bottom member 11. In the bottom member 11, the pressure chamber 14 and the suction passage 3 are disposed.

The insides of the expansion side chamber R1, the pressure side chamber R2, and the pressure chamber 14 are filled with liquid such as operation oil. The inside of the reservoir R is filled with liquid and gas. The liquid may employ, for example, liquid such as water and water solution other than the operation oil.

The following describes the respective portions of the shock absorber D1 in detail. The piston 2 couples to the one end 21a as the lower end of the piston rod 21 movably inserted through the inside of the cylinder 1. The portion between the piston rod 21 and the rod guide 8, which journals this piston rod 21, is sealed by a sealing member 12 so as to keep the inside of the cylinder 1 in a liquid-tight state.

The rod guide 8 gradually increases in outer diameter so as to fit the cylinder 1, the intermediate pipe 9, and the outer pipe 10. The upper end openings of the cylinder 1, the intermediate pipe 9, and the outer pipe 10 are obstructed by the rod guide 8.

The bottom member 11 fits the lower end of the cylinder 1. The bottom member 11 includes a small-diameter portion 11a, a middle-diameter portion 11b, a large-diameter portion 11c, a pipe portion 11d, and a plurality of cutouts 11e. The small-diameter portion 11a fits the inside of the cylinder 1. The middle-diameter portion 11b fits the inside of the intermediate pipe 9 whose outer diameter is larger than that of the small-diameter portion 11a. The large-diameter portion 11c is disposed on the lower end side of the middle-diameter portion 11b, and has an outer diameter larger than that of the middle-diameter portion 11b. The pipe portion 11d is disposed on the lower end side of the large-diameter portion 11c. The plurality of cutouts 11e is disposed in the pipe portion 11d.

The outer pipe 10 internally houses the bottom member 11, the cylinder 1, the intermediate pipe 9, the rod guide 8, and the sealing member 12. The upper end of the outer pipe 10 is crimped such that the bottom member 11, the cylinder 1, the intermediate pipe 9, the rod guide 8, and the sealing member 12 are pinched by a crimp portion 10a of the outer pipe 10 and a bottom portion 10b of the outer pipe 10, so as to secure these members to the outer pipe 10. Instead of crimping the opening end of the outer pipe 10, a cap to be screwed to the opening end may be disposed such that the cap and the bottom portion 10b pinch the bottom member 11, the cylinder 1, the intermediate pipe 9, the rod guide 8, and the sealing member 12.

The suction passage 3 disposed in the bottom member 11 includes a passage 3a, which communicates between the reservoir R and the pressure side chamber R2, and a check valve 3b, which is disposed in the passage 3a. Specifically, the passage 3a has one side opened in the upper end of the small-diameter portion 11a of the bottom member 11 and the other side opened in the lower end of the large-diameter portion 11c. The passage 3a opened in the lower end of the large-diameter portion 11c communicates with the reservoir R through the cutout 11e. The check valve 3b opens only in the case where liquid flows from the reservoir R toward the pressure side chamber R2. The suction passage 3 allows only a flow of liquid from the reservoir R toward the pressure side chamber R2 and blocks a flow to the opposite direction, so as to be set as a one-way passage.

The piston 2 includes the rectifying passage 4, which allows only a flow of liquid from the pressure side chamber R2 toward the expansion side chamber R1. The rectifying passage 4 includes a passage 4a, which causes the pressure side chamber R2 to communicate with the expansion side chamber R1, and a check valve 4b disposed in the passage 4a. The check valve 4b opens only in the case where liquid flows from the pressure side chamber R2 toward the expansion side chamber R1. The rectifying passage 4 allows only a flow of liquid from the pressure side chamber R2 toward the expansion side chamber R1 and blocks a flow to the opposite direction, so as to be set as a one-way passage.

Adjacent to the upper end of the cylinder 1, a through hole 1a facing the expansion side chamber R1 is disposed. The expansion side chamber R1 communicates with a ring-shaped gap formed between the cylinder 1 and the intermediate pipe 9 through the through hole 1a. The ring-shaped gap between the cylinder 1 and the intermediate pipe 9 forms the discharge passage 7, which communicates between the expansion side chamber R1 and the reservoir R. The damping force variable valve V is disposed in a valve block 13 secured by being bridged between the outer pipe 10 and the intermediate pipe 9. The damping force variable valve V includes a flow passage 13a, a valve element 13b, a pilot passage 13c, and a pressing device 13d. The flow passage 13a couples the discharge passage 7 inside the intermediate pipe 9 to the reservoir R. The valve element 13b is disposed in the middle of the flow passage 13a. The pilot passage 13c causes the pressure of the expansion side chamber R1 in the upstream side of the valve element 13b to act to press the valve element 13b in the valve opening direction. The pressing device 13d generates the pressing force pressing the valve element 13b in the valve closing direction and causes a variable pressing force. The pressing device 13d illustrated in FIG. 1 controls the pressure pressing the valve element 13b in the valve closing direction using a solenoid, and allows changing this pressure corresponding to the current supply amount supplied to the solenoid from outside. The pressing device 13d is not limited to this, but may directly press the valve element 13b using an actuator such as a solenoid. The pressing device 13d may be any type insofar as the pressing device 13d can change the pressing force corresponding to the current amount or the voltage amount to be supplied. In the case where the liquid is magneto-rheological fluid, instead of the damping force variable valve V, a damping force adjusting unit that cause a magnetic field acting on the flow passage that communicates between the discharge passage 7 and the reservoir R to, for example, a coil or similar member may be used. In this case, the current amount supplied from outside is used to adjust the size of the magnetic field so as to change the resistance provided to the flow of the magneto-rheological fluid passing through the flow passage. In the case where the fluid is electrorheological fluid, the damping force adjusting unit may cause an electric field acting on the flow passage that communicates between the discharge passage 7 and the reservoir R. In this case, the size of the electric field is adjusted by the voltage provided from outside so as to change the resistance provided to the electrorheological fluid flowing through the flow passage.

When the shock absorber D1 performs a contraction operation, the piston 2 moves downward to compress the pressure side chamber R2 so as to move the liquid inside the pressure side chamber R2 to the expansion side chamber R1 via the rectifying passage 4. During the contraction operation, the piston rod 21 enters the inside of the cylinder 1. This causes an excessive amount of liquid corresponding to the entrance volume of the piston rod inside the cylinder 1. The excessive liquid is extruded from the cylinder 1 so as to be discharged to the reservoir R via the discharge passage 7. The shock absorber D1 causes the damping force variable valve V to provide resistance to the flow of liquid moving to the reservoir R through the discharge passage 7, to increase the pressure inside the cylinder 1 so as to generate a pressure-side damping force.

On the other hand, when the shock absorber D1 performs an expansion operation, the piston 2 moves upward to compress the expansion side chamber R1 so as to move the liquid inside the expansion side chamber R1 to the reservoir R via the discharge passage 7. During the expansion operation, the piston 2 moves upward so as to enlarge the volume of the pressure side chamber R2. However, the liquid equivalent to the enlargement is supplied from the reservoir R via the suction passage 3. The shock absorber D1 causes the damping force variable valve V to provide resistance to the flow of liquid that is discharged from the expansion side chamber R1, passes through the discharge passage 7, and moves to the reservoir R. This increases the pressure inside the expansion side chamber R1 so as to generate an expansion-side damping force.

Thus, with the expansion and contraction operation, the shock absorber D1 constantly discharges liquid from the inside of the cylinder 1 via the discharge passage 7 to the reservoir R. The shock absorber D1 is a uniflow-type shock absorber that circulates liquid through the pressure side chamber R2, the expansion side chamber R1, and the reservoir R in this order as a one-way passage, and causes the single damping force variable valve V to generate the damping forces on both the expansion and pressure sides. Setting the cross-sectional area of the piston rod 21 to half of the cross-sectional area of the piston 2 allows setting the identical amounts of operation oil discharged from the inside of the cylinder 1 on both the expansion and pressure sides insofar as the amplitudes of the piston 2 are identical. Accordingly, setting the identical resistances provided to the flows on both the expansion and pressure sides by the damping force variable valve V ensures the identical damping forces on the expansion side and the pressure side.

The pressure chamber 14 is formed by a hollow portion disposed in the bottom member 11. The pressure chamber 14 has different cross-sectional areas perpendicular to the above-below direction on the lower side and the upper side, and includes the small-cross-sectional-area portion 14a having a small cross-sectional area on the lower side, the large-cross-sectional-area portion 14b having a large cross-sectional area on the upper side, and a stepped portion 14c disposed in the middle of the small-cross-sectional-area portion 14a and the large-cross-sectional-area portion 14b.

The free piston 5 is slidably inserted into the pressure chamber 14. The free piston 5 has a stepped shape, and includes a plate-shaped base portion 5a, a pipe-shaped small-piston portion 5b, and a pipe-shaped large-piston portion 5c. The small-piston portion 5b extends downward from the lower end of the base portion 5a, and is slidably inserted into the small-cross-sectional-area portion 14a of the pressure chamber 14. The large-piston portion 5c rises upward from the outer periphery of the upper end of the base portion 5a, and is slidably inserted into the large-cross-sectional-area portion 14b of the pressure chamber 14. The free piston 5 can move in the above-below direction. The small-cross-sectional-area portion 14a and the large-cross-sectional-area portion 14b in the pressure chamber 14 only need to be formed along the sliding direction of the free piston 5.

The free piston 5 causes the small-piston portion 5b to be slidably inserted into the small-cross-sectional-area portion 14a, so as to define the small chamber 15 under the small-piston portion 5b inside the small-cross-sectional-area portion 14a. The free piston 5 causes the large-piston portion 5c to be slidably inserted into the large-cross-sectional-area portion 14b, so as to define the large chamber 16 over the large-piston portion 5c inside the large-cross-sectional-area portion 14b. The free piston 5 defines the outer peripheral chamber 17 between the base portion 5a and the stepped portion 14c inside the large-cross-sectional-area portion 14b and on the outer periphery of the small-piston portion 5b. On the outer periphery of the large-piston portion 5c of the free piston 5, a sealing ring 5d in slidable contact with the inner periphery of the large-cross-sectional-area portion 14b is mounted. Accordingly, the large chamber 16 and the outer peripheral chamber 17 do not communicate with each other through the outer periphery of the free piston 5. To prevent the communication between the outer peripheral chamber 17 and the small chamber 15, a sealing ring may be disposed in the outer periphery of the small-piston portion 5b.

The small chamber 15 communicates with the reservoir R through a passage 18 and the cutout 11e, which are disposed in the bottom member 11, such that the pressure derived from the reservoir R acts on the small chamber 15. The large chamber 16 communicates with the pressure side chamber R2 through the pressure-side first passage 19a and the pressure-side second passage 19b, which are opened in the upper end of the small-diameter portion 11a of the bottom member 11 and are opened in the upper end of the large-cross-sectional-area portion 14b. In the pressure-side first passage 19a, the first valve Va formed by a leaf valve is disposed. When the differential pressure between the pressure of the large chamber 16 and the pressure of the pressure side chamber R2 reaches the valve opening pressure, the first valve Va opens to provide resistance to the flow of liquid from the large chamber 16 toward the pressure side chamber R2. The first valve Va maintains a valve closed state with respect to the flow of liquid from the pressure side chamber R2 toward the large chamber 16. In the pressure-side first passage 19a, an orifice O1 is disposed parallel to the first valve Va. In the pressure-side second passage 19b, a second valve Vb formed by a leaf valve is disposed. When the differential pressure between the pressure of the pressure side chamber R2 and the pressure of the large chamber 16 reaches the valve opening pressure, the second valve Vb opens to provide resistance to the flow of liquid from the pressure side chamber R2 toward the large chamber 16. The second valve Vb maintains a valve closed state with respect to the flow of liquid from the large chamber 16 toward the pressure side chamber R2. In the pressure-side second passage 19b, an orifice O2 is disposed parallel to the second valve Vb. The pressure derived from the pressure side chamber R2 acts on the large chamber 16, and the large chamber 16 functions as a pressure-side pressure chamber communicating with the pressure side chamber R2.

The outer peripheral chamber 17 couples to the discharge passage 7 through the expansion side passage 20, which is disposed in the bottom member 11, and a through hole 1b, which faces the expansion side passage 20 and is disposed adjacent to the lower end of the cylinder 1. As described above, the discharge passage 7 communicates with the expansion side chamber R1 and thus the outer peripheral chamber 17 communicates with the expansion side chamber R1. Accordingly, the pressure derived from the expansion side chamber R1 acts on the outer peripheral chamber 17, and the outer peripheral chamber 17 functions as an expansion-side pressure chamber. The outer peripheral chamber 17 communicates with the expansion side chamber R1 using the discharge passage 7, which guides liquid to the damping force variable valve V disposed to ensure a uniflow structure of the shock absorber D1. Accordingly, it is not necessary to dispose another passage communicating with the outer peripheral chamber 17 in the expansion side chamber R1 even when the pressure chamber 14 is disposed in the bottom member 11. Thus, there is an advantage in cost reduction and weight reduction of the shock absorber D1.

The pressure inside the large chamber 16, that is, the pressure (the pressure derived from the pressure side chamber) introduced from the pressure side chamber R2 acts on the horizontal surface (a pressure-side pressure-receiving area A1) of the large-piston portion 5c of the free piston 5, so as to press the free piston 5 downward as the direction to compress the small chamber 15 and the outer peripheral chamber 17. It should be noted that, the horizontal surface is a surface perpendicular to the above-below direction in FIG. 1. The pressure-side pressure-receiving area A1 is an area surrounded by the outer edge of the cross-sectional surface obtained by cutting the large-piston portion 5c in the horizontal direction.

On the other hand, the pressure inside the outer peripheral chamber 17, that is, the pressure (the pressure derived from the expansion side chamber) introduced from the expansion side chamber R1 acts on the horizontal surface (an expansion-side pressure-receiving area B1) of the free piston 5 defining the outer peripheral chamber 17. Furthermore, the pressure inside the small chamber 15, that is, the pressure of the reservoir R acts on the horizontal surface (a pressure-receiving area C1) of the small-piston portion 5b of the free piston 5 so as to press the free piston 5 upward as the direction to compress the large chamber 16. It should be noted that, the horizontal surface is a surface perpendicular to the above-below direction in FIG. 1. The expansion-side pressure-receiving area B1 is an area surrounded by: the outer edge of the cross-sectional surface obtained by cutting the large-piston portion 5c in the horizontal direction; and the outer edge of the cross-sectional surface obtained by cutting the small-piston portion 5b in the horizontal direction. The pressure-receiving area C1 is an area surrounded by the outer edge of the cross-sectional surface obtained by cutting the small-piston portion 5b in the horizontal direction.

Thus, the pressure derived from the pressure side chamber acts on the free piston 5 so as to press the free piston 5 to one side (downward in FIG. 1) in the sliding direction, and the pressure derived from the expansion side chamber acts on the free piston 5 so as to press the free piston 5 to the other side (upward in FIG. 1) in the sliding direction. The pressure-side pressure-receiving area A1 on which the pressure-side-chamber-derived pressure of the free piston 5 acts is set to be larger than the expansion-side pressure-receiving area B1 on which the expansion-side-chamber-derived pressure of the free piston 5 acts. The pressure derived from the reservoir R acts on the pressure-receiving area C1 other than the expansion-side pressure-receiving area B1 on which the expansion-side-chamber-derived pressure acts, that is, the surface facing the small chamber 15, so as to press the free piston 5 to the other side in the sliding direction.

To cause the action of the biasing force for reducing the displacement of the free piston 5 with respect to the pressure chamber 14, a pressure-side spring 6a and an expansion-side spring 6b, which are coiled springs as the spring element 6, are disposed. Inside the large chamber 16, the pressure-side spring 6a is interposed in a compressed state between the top wall of the large-cross-sectional-area portion 14b and the base portion 5a of the free piston 5. Inside the small chamber 15, the expansion-side spring 6b is interposed in a compressed state between the bottom wall of the small-cross-sectional-area portion 14a and the base portion 5a of the free piston 5. Thus, the free piston 5 is sandwiched from the upper and lower sides by the pressure-side spring 6a and the expansion-side spring 6b so as to be positioned in the predetermined center position inside the pressure chamber 14. The displacement from the center position causes the pressure-side spring 6a and the expansion-side spring 6b to generate biasing forces that restore the free piston 5 to the center position. The center position does not mean the center in the axial direction of the pressure chamber 14, but means the position where the free piston 5 is positioned by the spring element 6.

The spring element 6 may be a member that allows positioning the free piston 5 in the center position and generating a biasing force, that is, a member other than the coiled spring. For example, an elastic body such as a disc spring may be used as the spring element 6 so as to elastically support the free piston 5. In the case where the single spring element 6 whose one end coupled to the free piston 5 is used, the other end may be secured to the top wall of the large-cross-sectional-area portion 14b or the bottom wall of the small-cross-sectional-area portion 14a.

As the spring element 6, the pressure-side spring 6a and the expansion-side spring 6b are used. On both sides of the base portion 5a of the free piston 5, the pipe-shaped small-piston portion 5b and large-piston portion 5c are disposed. Accordingly, it is possible to house: the pressure-side spring 6a inside the large-piston portion 5c; and the expansion-side spring 6b inside the small-piston portion 5b. Accordingly, it is possible to ensure expansion and contraction space for the pressure-side spring 6a and the expansion-side spring 6b so as to ensure a sufficient stroke length of the free piston 5 and shorten the whole length of the pressure chamber 14. In the case where there is no limitation on the whole length or the stroke length of the shock absorber D1 and it is possible to ensure a sufficient whole length of the pressure chamber 14, the free piston 5 may have a structure where the solid column-shaped small-piston portion 5b and large-piston portion 5c are integrated.

The pressure chamber 14 of the shock absorber D1 employs the free piston 5 to define the outer peripheral chamber 17 as the expansion-side pressure chamber and the large chamber 16 as the pressure-side pressure chamber. Movement of the free piston 5 changes the volumes of the large chamber 16 and the outer peripheral chamber 17.

In the case where the shock absorber D1 performs an expansion operation, the piston 2 moves upward such that liquid is discharged from the expansion side chamber R1, which is compressed, to the reservoir R through the damping force variable valve V and liquid is supplied to the pressure side chamber R2, which is enlarged, from the reservoir R through the suction passage 3. The pressure inside the expansion side chamber R1 increases, and the pressure inside the pressure side chamber R2 become approximately equal to the pressure inside the reservoir R.

The outer peripheral chamber 17 communicates with the expansion side chamber R1, and the pressure derived from the expansion side chamber R1 acts inside the outer peripheral chamber 17. The small chamber 15 communicates with the reservoir R, and thus the inside of the small chamber 15 also has a pressure approximately equal to that inside the reservoir R. On the other hand, the large chamber 16 communicates with the pressure side chamber R2 through the pressure-side first passage 19a where the first valve Va is disposed. Accordingly, when the free piston 5 is pressed upward by the pressure increase inside the outer peripheral chamber 17, the first valve Va opens so as to communicate between the large chamber 16 and the pressure side chamber R2. At this time, the pressure inside the large chamber 16 becomes higher than the pressure inside the pressure side chamber R2 by the amount corresponding to the pressure loss in the first valve Va with reference to the pressure of the pressure side chamber R2.

Accordingly, in the case where the shock absorber D1 performs an expansion operation, a pressure higher than the pressure of the reservoir R by the amount corresponding to the pressure loss of the first valve Va acts on the pressure-side pressure-receiving area A1 of the free piston 5, a pressure approximately equal to the pressure of the reservoir R acts on the pressure-receiving area C1, and a high pressure derived from the expansion side chamber R1 to be compressed acts on the expansion-side pressure-receiving area B1. Accordingly, the free piston 5 is moved by being pressed upward. When the free piston 5 moves, liquid flows into the outer peripheral chamber 17 corresponding to the movement amount of the free piston 5 and liquid is discharged from the large chamber 16 to the pressure side chamber R2. In this case, the pressure chamber 14 functions as an apparent flow passage, and the liquid moves from the expansion side chamber R1 to the pressure side chamber R2 while bypassing the damping force variable valve V. When the moving speed of the free piston 5 becomes high, the first valve Va correspondingly widely opens the pressure-side first passage 19a. Accordingly, compared with the case where the large chamber 16 and the pressure side chamber R2 communicate with each other by the orifices O1 and O2 alone, the degree of the pressure increase inside the large chamber 16 with respect to the moving speed of the free piston 5 becomes low.

On the other hand, in the case where the shock absorber D1 performs a contraction operation, the piston 2 moves downward. Accordingly, the rectifying passage 4 causes a communication state between the pressure side chamber R2 to be compressed and the expansion side chamber R1 to be enlarged, such that the liquid from the inside of the cylinder 1 is discharged to the reservoir R via the damping force variable valve V. Accordingly, the pressures inside the expansion side chamber R1 and inside the pressure side chamber R2 are approximately equal to each other and both increase.

The outer peripheral chamber 17 communicates with the expansion side chamber R1 via the expansion side passage 20, and the pressure derived from the expansion side chamber R1 acts inside the outer peripheral chamber 17. The small chamber 15 communicates with the reservoir R, and thus the inside of the small chamber 15 also has a pressure approximately equal to that inside the reservoir R. On the other hand, the large chamber 16 communicates with the pressure side chamber R2 through the pressure-side second passage 19b where the second valve Vb is disposed. The pressure increase inside the pressure side chamber R2 causes the second valve Vb to open so as to communicate between the large chamber 16 and the pressure side chamber R2. In this case, the pressure inside the large chamber 16 becomes lower than the pressure inside the pressure side chamber R2 by the amount corresponding to the pressure loss in the second valve Vb with reference to the pressure of the pressure side chamber R2.

Accordingly, in the case where the shock absorber D1 performs a contraction operation, a pressure lower than the pressure of the pressure side chamber R2 by the amount corresponding to the pressure loss of the second valve Vb acts on the pressure-side pressure-receiving area A1 of the free piston 5, a pressure approximately equal to the pressure of the expansion side chamber R1 acts on the expansion-side pressure-receiving area B1, and the pressure of the reservoir R acts on the pressure-receiving area C1. The pressure-side pressure-receiving area A1 is larger than the expansion-side pressure-receiving area B1. The pressure loss of the second valve Vb is set such that the value of the product of the pressure inside the large chamber 16 during the contraction operation of the shock absorber D1 and the pressure-side pressure-receiving area A1 becomes larger than the value of the product of the pressure of the outer peripheral chamber 17 and the expansion-side pressure-receiving area B1. Accordingly, the free piston 5 is pressed to move to the lower side. When the free piston 5 moves, liquid is discharged from the outer peripheral chamber 17 to the discharge passage 7, but liquid flows into the large chamber 16 from the pressure side chamber R2 and liquid is discharged to the reservoir R from the small chamber 15. In this case, the liquid in the amount obtained by subtracting the volume reduction amount of the outer peripheral chamber 17 from the volume expansion amount of the large chamber 16 moves from the inside of the cylinder 1 to the reservoir R. That is, the pressure chamber 14 functions as the apparent flow passage, and the liquid discharged from the small chamber 15 moves from the inside of the cylinder 1 to the reservoir R while bypassing the damping force variable valve V. When the moving speed of the free piston 5 becomes high, the second valve Vb correspondingly widely opens the pressure-side second passage 19b. Accordingly, compared with the case where the large chamber 16 and the pressure side chamber R2 communicate with each other by the orifices O1 and O2 alone, the degree of pressure decrease inside the large chamber 16 with respect to the moving speed of the free piston 5 becomes low.

Thus, the pressure derived from the pressure side chamber acts on the free piston 5 so as to press the free piston 5 to one side (downward in FIG. 1) in the sliding direction, and the pressure derived from the expansion side chamber acts on the free piston 5 so as to press the free piston 5 to the other side (upward in FIG. 1) in the sliding direction. The pressure-side pressure-receiving area A1 on which the pressure-side-chamber-derived pressure of the free piston 5 acts is set to be larger than the expansion-side pressure-receiving area B1 on which the expansion-side-chamber-derived pressure of the free piston 5 acts. Accordingly, also in the shock absorber that is set as a uniflow type and whose structure provides equal pressures to the expansion side chamber R1 and the pressure side chamber R2 during the contraction operation, the free piston 5 can operate such that the pressure chamber 14 functions as an apparent flow passage.

Here, under the condition where the piston speed is identical in both cases of low and high vibration frequencies input to the shock absorber D1, in the case where the input frequency is low, the amplitude of the vibration to be input becomes large and the amplitude of the free piston 5 becomes large. Accordingly, in this case, the biasing force that the free piston 5 receives from the spring element 6 constituted of the pressure-side spring 6a and the pressure-side spring 6b becomes large. In the case where the shock absorber D1 expands and contracts at a low vibration frequency, the stroke amount becomes large and thus the flow rate of the liquid discharged from the cylinder 1 to the reservoir R is high. In this case, the amplitude of the free piston 5 becomes large and then the biasing force of the spring element 6 becomes large. Accordingly, the free piston 5 has difficulty in moving further. This reduces the exchange of liquid between the expansion side chamber R1 and the pressure side chamber R2 via the pressure chamber 14, which functions as the apparent passage. Accordingly, the flow rate passing through the damping force variable valve V becomes high so as to maintain the high damping force generated by the shock absorber D1. On the other hand, in the case where the input frequency to the shock absorber D1 is high, the amplitude of the vibration to be input becomes small and then the amplitude of the piston 2 is also small. In this case, the flow rate discharged from the cylinder 1 to the reservoir R is low and the amplitude of the free piston 5 becomes small. Thus, the biasing force that the free piston 5 receives from the spring element 6 is small. Accordingly, even when the shock absorber D1 is in an expansion stroke or a contraction stroke, the ratio of the flow rate passing through the apparent passage (the pressure chamber 14) to the flow rate passing through the damping force variable valve V becomes higher than that during a low-frequency vibration. This reduces the damping force generated by the shock absorber D1.

Figure 2:
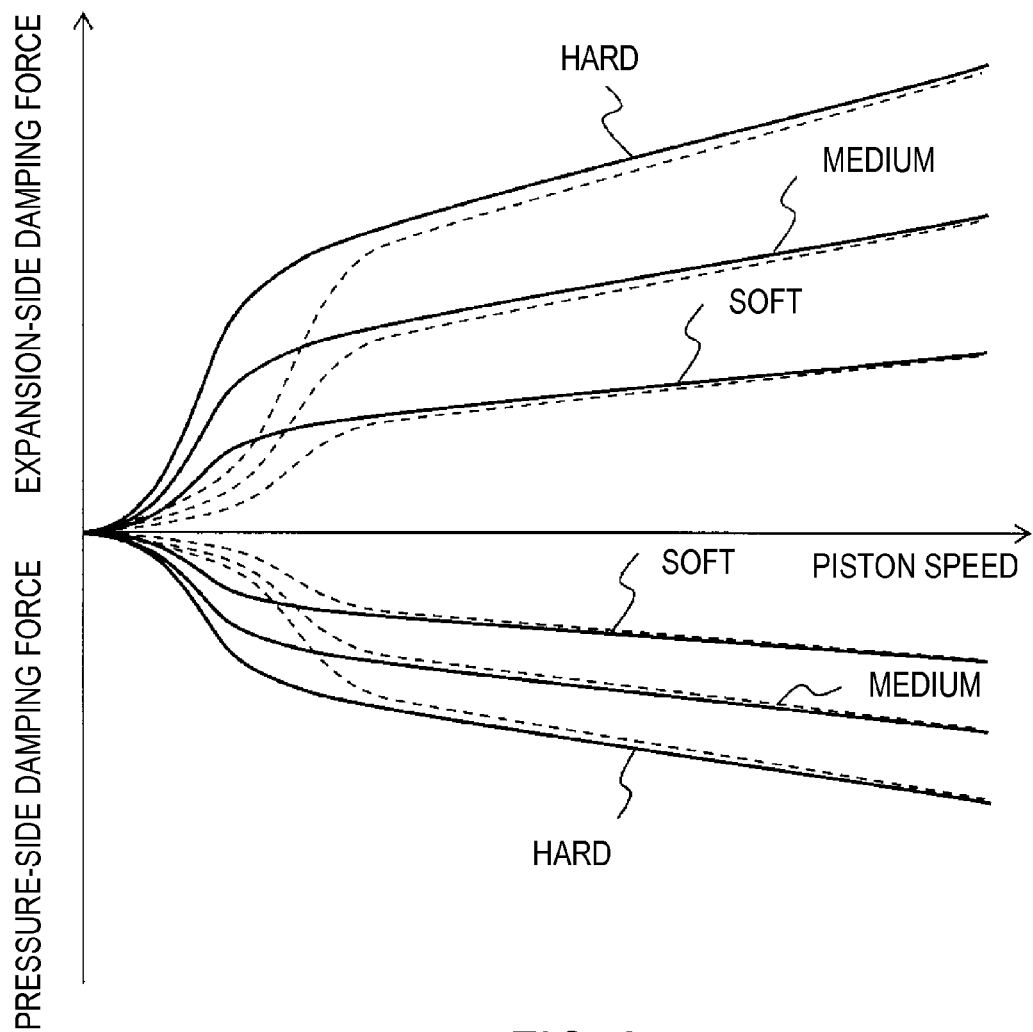
FIG. 2 is an attenuation characteristic diagram of the shock absorber according to the embodiment.

Even when the stretching speed of the shock absorber D1 becomes high and thus the flow rate of liquid exchanged between the large chamber 16 and the pressure side chamber R2 increases, the first valve Va and the second valve Vb correspondingly widely open the pressure-side first passage 19a and the pressure-side second passage 19b. Therefore, the free piston 5 does not have difficulty in movement compared with the configuration where the large chamber 16 and the pressure side chamber R2 communicate with each other by the orifices alone. Accordingly, a damping-force reduction effect is provided also when the stretching speed of the shock absorber D1 reaches a high speed range. Specifically, the attenuation characteristic of the shock absorber D1 is illustrated in FIG. 2. The respective solid lines in FIG. 2 denote attenuation characteristics in the case where the damping forces on the expansion side and the pressure side of the shock absorber D1 are set to be soft, medium, and hard by the damping force variable valve V as the damping force adjusting unit. The dashed lines denote the characteristics of the damping forces in the case where a high frequency vibration is input to the shock absorber D1 so as to reduce the damping force under the conditions where the soft, medium, and hard attenuation characteristics are set.

As illustrated in FIG. 2, this shock absorber D1 can change the damping force depending on the input vibration frequency. Accordingly, in response to an input of a low-frequency vibration in a resonant frequency band of the vehicle body (a spring upper material) of the vehicle, the shock absorber D1 generates a high damping force. This allows stabilizing the posture of the vehicle body (the spring upper material) so as to prevent the occupant from feeling uncomfortable during turning of the vehicle. Furthermore, when a high-frequency vibration in a resonant frequency band of the wheel (a spring lower material) of the vehicle is input, the shock absorber D1 constantly generates a low damping force so as to prevent transmission of the vibration on the wheel side (the spring lower material side) to the vehicle body side (the spring upper material side). This allows ensuring satisfactory ride comfort in the vehicle. Also when the stretching speed of the shock absorber D1 becomes high, it is possible to provide the effect that reduces the damping force in response to an input of a high-frequency vibration. This allows further improving the ride comfort in the vehicle.

The shock absorber D1 can adjust the resistance provided to the flow of liquid by the damping force variable valve V, so as to adjust the damping force. That is, this shock absorber D1 allows the damping force variable valve V to adjust the damping force and, in addition, allows reducing the damping force with respect to a high-frequency vibration.

With respect to a vibration in a relatively low frequency band, the shock absorber D1 controls the damping force variable valve V as the damping force adjusting unit to adjust the damping force so as to allow damping the vehicle body vibration. Furthermore, with respect to a high-frequency vibration that cannot be reduced by control of the damping force variable valve V as the damping force adjusting unit, the shock absorber D1 allows mechanically generating a low damping force. This allows insulating the vibration from the wheel side so as to effectively reduce the vehicle body vibration and dramatically improve the ride comfort in the vehicle. Even when the stretching speed of the shock absorber D1 becomes high and thus the flow rate of the liquid exchanged between the large chamber 16 and the pressure side chamber R2 increases, the first valve Va and the second valve Vb correspondingly widely open the pressure-side first passage 19a and the pressure-side second passage 19b. Accordingly, a damping-force reduction effect is provided also when the stretching speed of the shock absorber D1 reaches a high speed range.

Any frequency band for reducing the damping force can be determined by settings of: the areas of the pressure-side pressure-receiving area A1, the expansion-side pressure-receiving area B1, and the pressure-receiving area C1 in the free piston 5; the flow passage resistances of the passage 18, the first valve Va, the second valve Vb, and the expansion side passage 20; and the spring constant (in this case, the combined spring constant of the pressure-side spring 6a and the expansion-side spring 6b) of the spring element 6.

The free piston 5 is positioned in the center position by the spring element 6 and is restored to the center position by the biasing force of the spring element 6. This allows reducing the occurrence of the situation where the free piston 5 stops in the stroke end such that the shock absorber D1 cannot provide the damping-force reduction effect during input of a high-frequency vibration.

Instead of the above-described configuration, the outer peripheral chamber 17 may communicate with the reservoir R, and the small chamber 15 may communicate with the expansion side chamber R1 through the expansion side passage. This configuration also allows the pressure derived from the pressure side chamber to act on the free piston 5 so as to press the free piston 5 to one side (downward in FIG. 1) in the sliding direction and allows the pressure derived from the expansion side chamber to act on the free piston 5 so as to press the free piston 5 to the other side (upward in FIG. 1) in the sliding direction. In this case, the pressure-side pressure-receiving area A1 on which the pressure-side-chamber-derived pressure of the free piston 5 acts is larger than the portion C1 on which the expansion-side-chamber-derived pressure of the free piston 5 acts. Accordingly, similarly to the above-described configuration, the pressure chamber 14 can function as an apparent flow passage.

Instead of the configuration where the small chamber 15 communicates with the reservoir R, the small chamber 15 may communicate with the outside of the shock absorber D1 so as to be opened to the atmosphere or a low-pressure gas may be enclosed in the small chamber 15 so as to use the small chamber 15 as an air chamber. Also with this configuration, in the case where the shock absorber D1 performs an expansion operation, the free piston 5 is moved by being pressed upward, liquid flows into the outer peripheral chamber 17 corresponding to the movement amount of the free piston 5, and liquid is discharged from the large chamber 16 to the pressure side chamber R2. The pressure chamber 14 functions as the apparent flow passage, and the liquid moves from the expansion side chamber R1 to the pressure side chamber R2 while bypassing the damping force variable valve V. In the case where the shock absorber D1 performs a contraction operation, the free piston 5 is moved by being pressed downward such that the total volume of the outer peripheral chamber 17 and the large chamber 16 is enlarged and the amount of the liquid passing through the damping force variable valve V decreases. Thus, the shock absorber D1 allows providing an effect that reduces the damping force with respect to a high-frequency vibration, similarly to the case where the small chamber 15 communicates with the reservoir R. In the case where the inside of the small chamber 15 is set as the air chamber, the expansion-side spring can be set as a gas spring. In the case where the small chamber 15 is opened to the atmosphere or set as the air chamber, the small chamber 15 need not communicate with the reservoir R. Accordingly, a housing forming the pressure chamber 14 can be secured to the piston rod 21 or disposed inside the piston rod 21. In the case where the small chamber 15 communicates with the reservoir R, it is possible to completely house the pressure chamber 14 within the shock absorber D1 and prevent mixing of gas from the small chamber 15 to the outer peripheral chamber 17 or the large chamber 16. In the case where the small chamber 15 communicates with the expansion side chamber R1, the outer peripheral chamber 17 can be set as an air chamber.

The cross-sectional shape of the outer periphery of the free piston 5 and the cross-sectional shape of the inner wall of the pressure chamber 14 can employ shapes other than the circular shapes.

Figure 3:
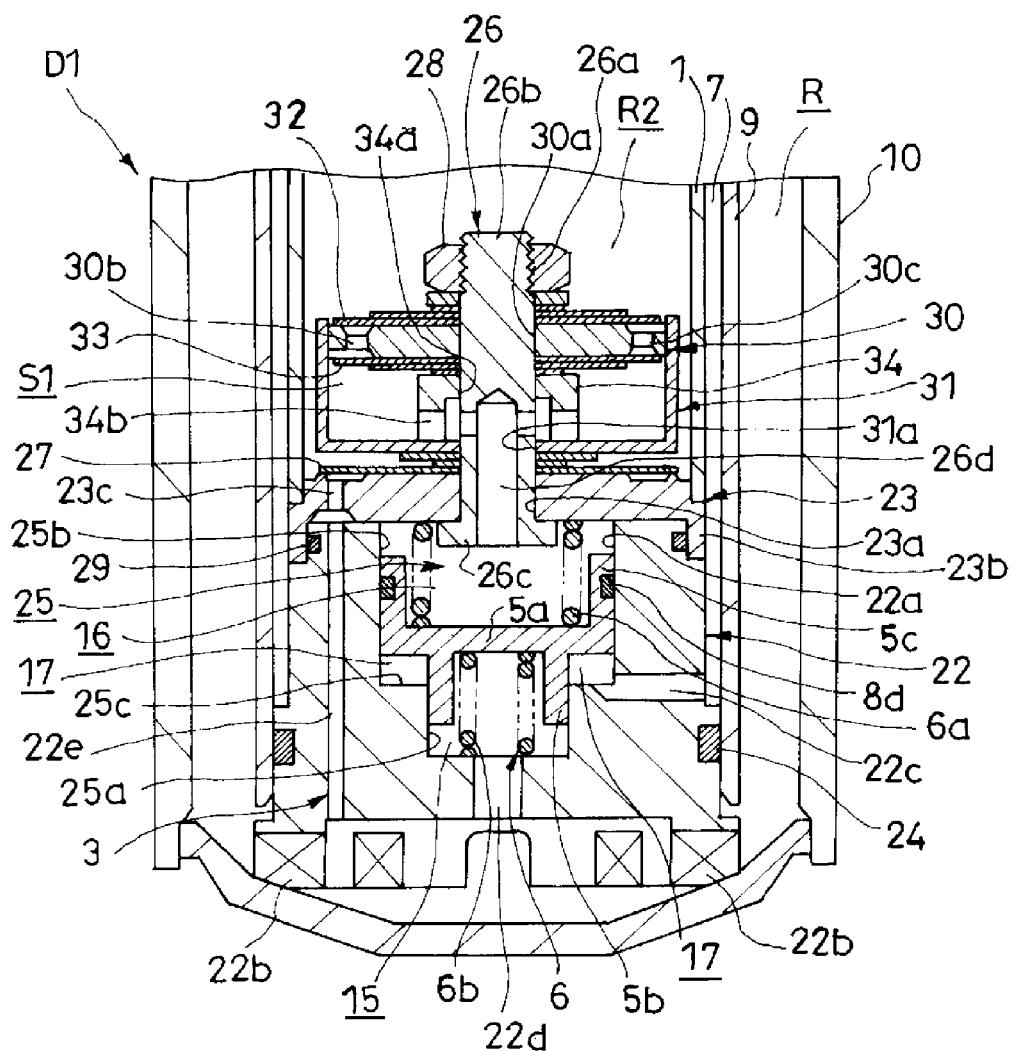
FIG. 3 is a vertical cross-sectional view of one example of a specific bottom member in the shock absorber according to the embodiment.

The following describes a specific configuration of the bottom member 11. For example, as illustrated in FIG. 3, the bottom member 11 includes a case member 22, a lid member 23, a valve disc 30, and a cap 31. The lid member 23 obstructs the case member 22, which includes a hollow portion 22a into which the free piston 5 is inserted, and the hollow portion 22a of the case member 22. The valve disc 30 couples to the lid member 23 via a coupling rod 26, and is disposed inside a pressure side chamber R2. The cap 31 is mounted on the outer periphery of the coupling rod 26 and fits the valve disc 30 so as to define a room S1 inside the pressure side chamber R2. The valve disc 30 includes a first valve 32 and a second valve 33, which are formed by leaf valves.

The case member 22, which has a columnar shape, has the outer periphery including three stepped portions and has an outer diameter gradually shrinking upward. The outer periphery of the second stepped portion from the bottom of the case member 22 fits the intermediate pipe 9. The third stepped portion from the bottom is positioned inside the intermediate pipe 9 while having a gap with the intermediate pipe 9. The outer diameter of the lowest step of the case member 22 is formed to be larger than the inner diameter of the intermediate pipe 9. In the outer periphery of the second stepped portion, which fits the intermediate pipe 9, from the bottom of the case member 22, a sealing ring 24 is mounted. This prevents communication between the discharge passage 7 and the reservoir R through the outer periphery of the case member 22. The outer periphery of the lowest step of the case member 22 has a cylindrical shape, and includes a plurality of cutouts 22b, which communicate between the inside and outside.

The case member 22 has an upper end that includes the opened hollow portion 22a. The opening portion of the hollow portion 22a is obstructed by the lid member 23 so as to form a pressure chamber 25 inside the case member 22. The hollow portion 22a includes a large-cross-sectional-area portion 25b, which is formed on the opening portion side, and a small-cross-sectional-area portion 25a, which is formed under the large-cross-sectional-area portion 25b and has a diameter smaller than that of the large-cross-sectional-area portion 25b. Between the small-cross-sectional-area portion 25a and the large-cross-sectional-area portion 25b, a stepped portion 25c is formed.

The case member 22 includes a through hole 22c, a passage 22d, and a passage 22e. The through hole 22c is opened in the outer periphery of the third stepped portion from the bottom of the case member 22 and communicates with the stepped portion 25c. The passage 22d communicates with the bottom surface of the hollow portion 22a from the lower end of the case member 22. The passage 22e passes through the case member 22 in the above-below direction.

The lid member 23 includes: a circular plate-shaped bolt insertion hole 23a, which is disposed along the above-below direction, in the center; a pipe-shaped socket 23b, which is disposed to extend downward, in the outer periphery; and a port 23c, which is disposed along the above-below direction. Fitting of the socket 23b of the lid member 23 onto the distal end of the case member 22 obstructs the hollow portion 22a so as to form the pressure chamber 25 inside the case member 22.

The hollow portion 22a of the case member 22 internally houses the free piston 5, the pressure-side spring 6a, and the expansion-side spring 6b. When the socket 23b of the lid member 23 fits the distal end of the case member 22, the pressure-side spring 6a and the expansion-side spring 6b are compressed such that the free piston 5 is positioned in the center position by the biasing forces of the pressure-side spring 6a and the expansion-side spring 6b.

The pressure chamber 25 is defined as the small chamber 15, the large chamber 16, and the outer peripheral chamber 17 by insertion of the free piston 5. The small chamber 15 communicates with the reservoir R through the passage 22d, which is disposed in the case member 22. The outer peripheral chamber 17 communicates with the discharge passage 7 through the through hole 22c. The through hole 22c, which is opened in the stepped portion 25c, is formed to keep the communication between the outer peripheral chamber 17 and the discharge passage 7 until the free piston 5 is completely brought into close contact with the stepped portion 25c.

The coupling rod 26 is inserted through the bolt insertion hole 23a. The coupling rod 26 includes a shaft portion 26b, whose distal end includes a threaded portion 26a, and a head 26c, which is formed in the base end of the shaft portion 26b. On the outer periphery of the shaft portion 26b of the coupling rod 26, a disk-shaped check valve 27 is mounted and placed on the top surface of the lid member 23. The check valve 27 is secured to the lid member 23 by the coupling rod 26 and a nut 28, which is screwed to the threaded portion 26a, and opens and closes the port 23c formed in the lid member 23. The coupling rod 26 internally includes a rod internal passage 26d, which is opened in the lower end of the head 26c and communicates with the side portion of the shaft portion 26b.

In the outer periphery of the shaft portion 26b of the coupling rod 26, over the check valve 27, the cap 31 in a bottomed cylindrical shape, a pipe-shaped spacer 34, the second valve 33, the valve disc 30, and the first valve 32 are assembled in this order. These members are sandwiched by the nut 28 and the head 26c in the coupling rod 26 so as to be secured to the lid member 23.

The cap 31 has a bottomed cylindrical shape and includes, in a bottom portion, a hole 31a through which the shaft portion 26b of the coupling rod 26 is inserted. The spacer 34 has a topped cylindrical shape and includes, in a top portion, a hole 34a through which the shaft portion 26b of the coupling rod 26 is inserted; and, in a pipe portion, a communication hole 34b which communicates between the inside and outside of the pipe portion. The valve disc 30 has, in the center, a hole 30a through which the shaft portion 26b of the coupling rod 26 is inserted; and, in a peripheral edge, a first port 30b and a second port 30c which are opened from the upper ends to the lower ends.

When the valve disc 30 is assembled in the shaft portion 26b across the spacer 34, the outer periphery of the valve disc 30 fits the inner periphery of the pipe portion of the cap 31. Accordingly, inside the cap 31, the room S1 is defined separately from the pressure side chamber R2. The room S1 communicates with the pressure side chamber R2 through the first port 30b and the second port 30c. One end of the rod internal passage 26d disposed inside the coupling rod 26 is opened in the side portion of the shaft portion 26b positioned inside the pipe portion of the spacer 34, and the other end is opened in the lower end of the head 26c positioned inside the large chamber 16. The inside of the pipe portion of the spacer 34 communicates with the room S1 through the communication hole 34b. Accordingly, the large chamber 16 communicates with the pressure side chamber R2 through the rod internal passage 26d, the inside of the spacer 34, the communication hole 34b, the room S1, the first port 30b, and the second port 30c.

The first valve 32 laminated on the surface on the pressure side chamber R2 side of the valve disc 30 is a laminated leaf valve where ring-shaped plates are laminated, and opens and closes the upper opening end of the first port 30b. The first valve 32 is a one-way passage that allows only the flow of liquid from the large chamber 16 toward the pressure side chamber R2 via the first port 30b, and provides resistance to the flow of the passing liquid.

The second valve 33 laminated on the surface on the room S1 side of the valve disc 30 is a laminated leaf valve where ring-shaped plates are laminated, and opens and closes the lower opening end of the second port 30c. The second valve 33 is a one-way passage that allows only the flow of liquid from the pressure side chamber R2 toward the large chamber 16 via the second port 30c, and provides resistance to the flow of the passing liquid.

In the shock absorber D1 illustrated in FIG. 3, the pressure-side first passage is formed by the first port 30b and the rod internal passage 26d while the pressure-side second passage is formed by the second port 30c and the rod internal passage 26d.

When the lid member 23 fits and integrated with the case member 22, the port 23c communicates with the reservoir R through the passage 22e. When the pressure inside the pressure side chamber R2 is reduced during the expansion operation of the shock absorber D1, the check valve 27, which opens and closes the port 23c, is warped on the outer periphery side to open so as to communicate between the reservoir R and the pressure side chamber R2 through the port 23c and the passage 22e. The check valve 27 constitutes the suction passage 3 together with the port 23c and the passage 22e.

When a sealing ring 29 is mounted on the portion where the lid member 23 and the case member 22 fit each other, the lid member 23 and the case member 22 are sealed so as to prevent direct communication between the discharge passage 7 and the large chamber 16.

In the shock absorber D1 illustrated in FIG. 3, the respective members constituting the bottom member 11 are incorporated in the shock absorber D1 without difficulty.

Figure 4:
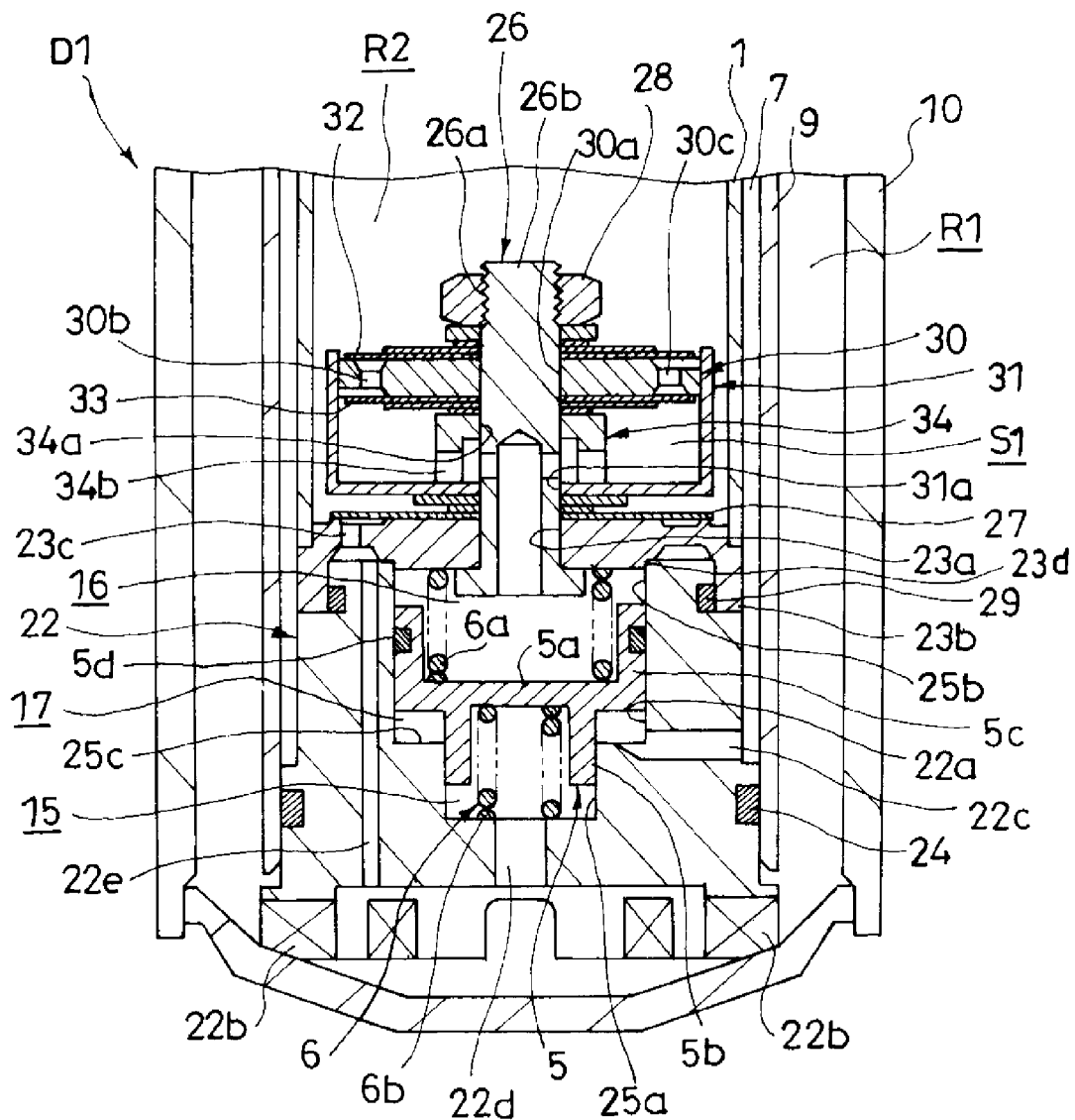
FIG. 4 is a vertical cross-sectional view of another example of the specific bottom member in the shock absorber according to the embodiment.

In the shock absorber D1 illustrated in FIG. 4, a ring-shaped groove 23d, which is press-fitted to the inner periphery of the pipe-shaped distal end of the case member 22 and where the port 23c is opened, is disposed in the lid member 23. When the wall on the inner peripheral side of the ring-shaped groove 23d is press-fitted to the inner periphery of the distal end of the case member 22 without causing a gap, the communication between the large chamber 16 and the suction passage 3 are reliably blocked so as to allow obtaining a stable damping-force reduction effect. The sealing ring 29 is mounted on the outer periphery of the pipe-shaped distal end of the case member 22, and has a contact with the inner periphery of the socket 23b. Instead, the sealing ring 29 may be mounted on the socket 23b side of the lid member 23 such that the sealing ring 29 is brought into close contact with the outer periphery of the distal end of the case member 22.

Figure 5:
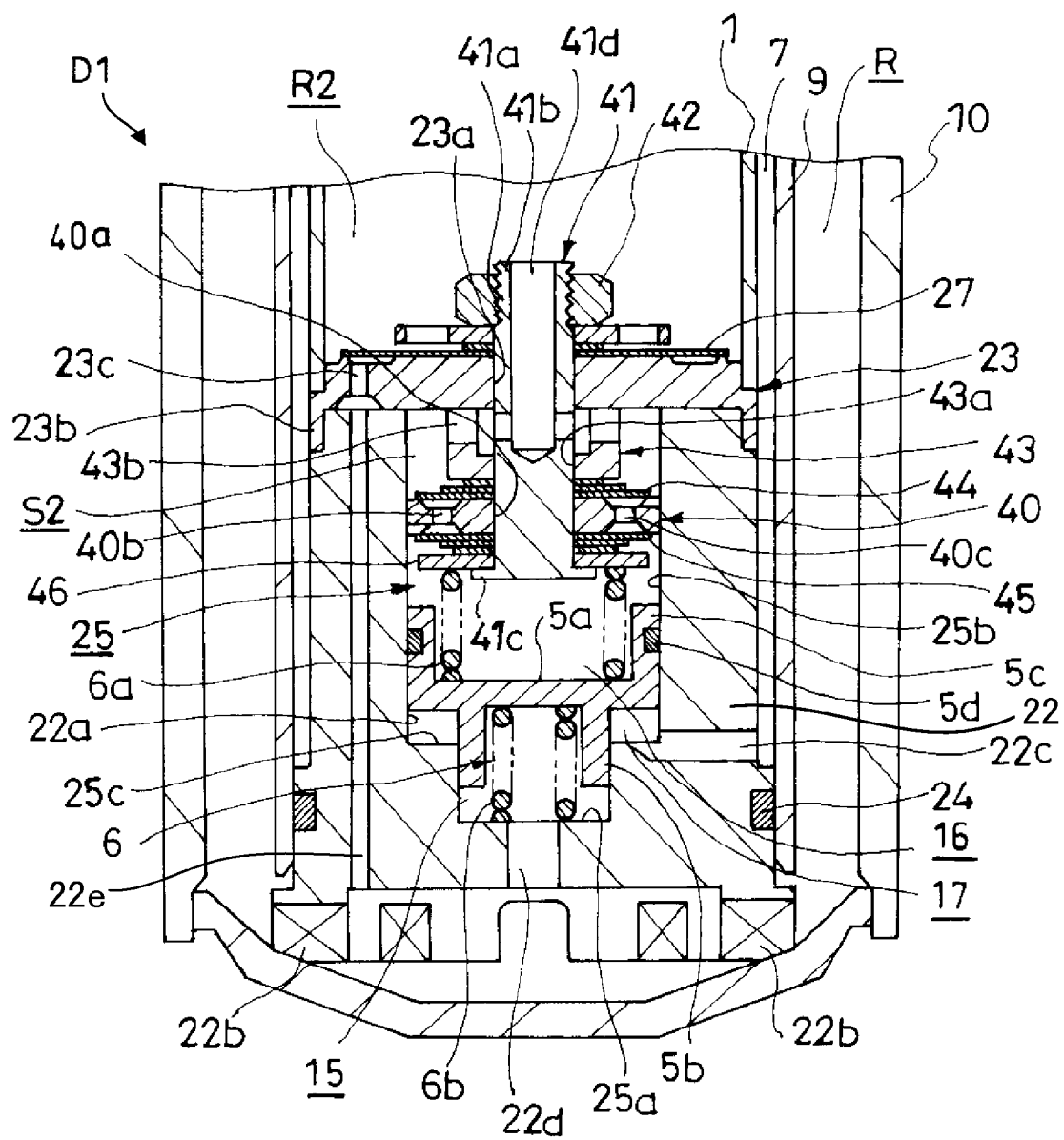
FIG. 5 is a vertical cross-sectional view of another example of the specific bottom member in the shock absorber according to the embodiment.

Compared with the shock absorber D1 in FIG. 3, the shock absorber D1 illustrated in FIG. 5 houses a valve disc 40 in the case member 22. The valve disc 40 couples to the lid member 23 by a coupling rod 41, and is housed in the hollow portion 22a of the case member 22.

The coupling rod 41 includes: a shaft portion 41b having a distal end with a threaded portion 41a; a head 41c formed in the base end of the shaft portion 41b; and a rod internal passage 41d, which is opened in the upper end of the shaft portion 41b and communicates with the side portion of the shaft portion 41b. On the outer periphery of the shaft portion 41b of the coupling rod 41, the check valve 27 is mounted and laminated on the surface on the pressure side chamber R2 side of the lid member 23. The check valve 27 is secured to the lid member 23 by the coupling rod 41 and a nut 42, which is screwed to the threaded portion 41a, and opens and closes the port 23c.

In the outer periphery of the shaft portion 41b of the coupling rod 41, under the lid member 23, a pipe-shaped spacer 43, a first valve 44, the valve disc 40, a second valve 45, and a perforated disc-shaped spring bearing 46 are assembled. These are sandwiched by the nut 42 and the head 41c in the coupling rod 41 so as to be secured to the lid member 23.

The spacer 43 has a bottomed cylindrical shape, and includes: in the bottom portion, a hole 43a through which the shaft portion 41b of the coupling rod 41 disposed is inserted; and a communication hole 43b, which is disposed in the pipe portion to communicate between the inside and outside of the pipe portion. The valve disc 40 includes: in the center, a hole 40a through which the shaft portion 41b of the coupling rod 41 is inserted; and a first port 40b and a second port 40c, which are opened from the upper ends to the lower ends.

The valve disc 40 is laminated on the lid member 23 via the spacer 43. When the valve disc 40 assembled in the shaft portion 41b is inserted into the hollow portion 22a, the outer periphery of the valve disc 40 fits the inner periphery of the hollow portion 22a of the case member 22. Accordingly, the hollow portion 22a is defined as the pressure chamber 25 and a room S2.

The pressure chamber 25 under the valve disc 40 internally houses the free piston 5, the pressure-side spring 6a, and the expansion-side spring 6b. When the socket 23b of the lid member 23 fits the distal end of the case member 22, the pressure-side spring 6a and the expansion-side spring 6b are compressed such that the free piston 5 are positioned in the center position by the biasing forces of the pressure-side spring 6a and the expansion-side spring 6b. The upper end of the pressure-side spring 6a abuts on and borne by the spring bearing 46. Accordingly, the pressure-side spring 6a does not interfere with the first valve 45. It is possible to employ the configuration where the pressure-side spring 6a is borne by the head 41c of the coupling rod 41 and eliminate the spring bearing 46.

The inside of the pressure chamber 25 is defined as the small chamber 15, the large chamber 16, and the outer peripheral chamber 17 by insertion of the free piston 5. The small chamber 15 communicates with the reservoir R through the passage 22d disposed in the case member 22. The outer peripheral chamber 17 communicates with the discharge passage 7 through the through hole 22c. The through hole 22c, which is opened in the stepped portion 25c, is formed to keep the communication between the outer peripheral chamber 17 and the discharge passage 7 until the free piston 5 is completely brought into close contact with the stepped portion 25c.

The room S2 communicates with the large chamber 16 through the first port 40b and the second port 40c. One end of the rod internal passage 41d disposed in the coupling rod 41 is opened in the side portion of the shaft portion 41b positioned inside the pipe portion of the spacer 43, and the other end is opened in the distal end of the shaft portion 41b facing the pressure side chamber R2. The inside of the pipe portion of the spacer 43 communicates with the room S2 through the communication hole 43b. Accordingly, the large chamber 16 communicates with the pressure side chamber R2 through the rod internal passage 41d, the inside of the spacer 43, the communication hole 43b, the room S2, the first port 40b, and the second port 40c.

The first valve 45 laminated on the surface on the large chamber 16 side of the valve disc 40 is a laminated leaf valve where ring-shaped plates are laminated, and opens and closes the lower-end opening end of the first port 40b. The first valve 45 is one-way passage that allows only the flow of liquid from the pressure side chamber R2 toward the large chamber 16 via the first port 40b, and provides resistance to the flow of the passing liquid.

The second valve 44 laminated on the surface on the pressure side chamber R2 side of the valve disc 40 is a laminated leaf valve where ring-shaped plates are laminated, and opens and closes the upper-end opening end of the second port 40c. The second valve 44 is a one-way passage that allows only the flow of liquid from the large chamber 16 toward the pressure side chamber R2 via the second port 40c, and provides resistance to the flow of the passing liquid.

In the shock absorber D1 illustrated in FIG. 5, the pressure-side first passage is formed by the first port 40b and the rod internal passage 41d while the pressure-side second passage is formed by the second port 40c and the rod internal passage 41d.

When the lid member 23 fits and integrated with the case member 22, the port 23c communicates with the reservoir R through the passage 22e. When the pressure inside the pressure side chamber R2 is reduced during the expansion operation of the shock absorber D1, the check valve 27, which opens and closes the port 23c, is warped on the outer periphery side to open so as to communicate between the reservoir R and the pressure side chamber R2 through the port 23c and the passage 22e. Similarly to the shock absorber D1 in FIG. 3, the check valve 27 constitutes the suction passage 3 together with the port 23c and the passage 22e.

In the shock absorber D1 illustrated in FIG. 5, the respective members constituting the bottom member 11 are incorporated in the shock absorber D1 without difficulty.

In the shock absorber D1 in FIG. 3, the pressure side chamber R2 internally houses the valve disc 30, the first valve 32, and the second valve 33. In the shock absorber D1 in FIG. 5, the bottom member 11 internally houses the valve disc 40, the first valve 45, and the second valve 44. Accordingly, compared with the shock absorber D1 in FIG. 5 where the bottom member 11 internally houses the valve disc 40, the shock absorber D1 in FIG. 3 where the pressure side chamber R2 internally houses the valve disc 30 can ensure a large outer diameter of the valve disc 30 and can also ensure large outer diameters of the first valve 32 and the second valve 33. The deflection rigidities of the first valve 32 and the second valve 33 can be lower than the deflection rigidities of the first valve 45 and the second valve 44. Accordingly, the pressure loss when the first valve 32 and the second valve 33 open is smaller than that when the first valve 45 and the second valve 44 open. Thus, the shock absorber D1 in FIG. 3 allows increasing the amount of reduction in damping-force reduction effect during input of a high-frequency vibration compared with the shock absorber D1 in FIG. 5.

The pressure chambers 14 and 25 in the shock absorber D1 according to the embodiment are formed such that the free piston 5 is movable in the above-below direction. Instead, the pressure chambers 14 and 25 may be formed such that the free piston 5 is movable not in the above-below direction but in the lateral direction or the oblique direction. In this case, the free piston 5 is less likely to be affected by vibration in the above-below direction to be input to the shock absorber D1. In the case where the pressure chambers 14 and 25 are formed such that the free piston 5 is movable in the above-below direction, it is possible to employ the large-sized free piston 5 so as to easily ensure the stroke amount of the free piston 5.

This embodiment described above provides the following operation and effect.

With the shock absorber according to the present invention, the damping force adjusting unit allows adjusting the damping force with respect to a vibration in a relatively low frequency band so as to damp the vehicle body vibration. The shock absorber allows mechanically generating a low damping force with respect to a high-frequency vibration that cannot be reduced by the damping force adjusting unit. This allows insulating the vibration from the wheel side so as to effectively reduce the vehicle body vibration and dramatically improve the ride comfort in the vehicle.

Even when the stretching speed of the shock absorber becomes high and thus the flow rate of the liquid exchanged between the large chamber and the pressure side chamber increases, the first valve and the second valve correspondingly widely open the pressure-side first passage and the pressure-side second passage. Accordingly, a damping-force reduction effect is provided also when the stretching speed of the shock absorber reaches a high speed range.

The embodiments of the present invention described above are merely illustration of some application examples of the present invention and the technical scope of the present invention is not limited to the specific constructions of the above embodiments.

This application is based on and claims priority to Japanese Patent Application No. 2013-060603 filed in Japan Patent Office on Mar. 22, 2013, the entire content of which is incorporated herein by reference.

The invention claimed is:

1. A shock absorber, comprising:
   a cylinder;
   a piston slidably inserted into the cylinder, the piston defining an expansion side chamber and an pressure side chamber inside the cylinder;
   a reservoir;
   a suction passage that allows only a flow of liquid from the reservoir toward the pressure side chamber;
   a rectifying passage that allows only a flow of liquid from the pressure side chamber toward the expansion side chamber;
   a damping force adjusting unit that allows only a flow of liquid from the expansion side chamber toward the reservoir, the damping force adjusting unit being configured to change resistance provided to the flow of liquid;
   a housing that includes a pressure chamber including a small-cross-sectional-area portion and a large-cross-sectional-area portion;
   a free piston that includes: a small-piston portion slidably inserted into the small-cross-sectional-area portion of the pressure chamber; and a large-piston portion slidably inserted into the large-cross-sectional-area portion of the pressure chamber, the free piston defining a small chamber inside the small-cross-sectional-area portion using the small-piston portion, the free piston defining an outer peripheral chamber in an outer periphery of the small-piston portion inside the large-cross-sectional-area portion, the free piston defining a large chamber inside the large-cross-sectional-area portion using the large-piston portion;
   a spring element configured to position the free piston in a center position of the pressure chamber, the spring element being configured to generate a biasing force to reduce displacement of the free piston from the center position;
   an expansion side passage that causes one of the small chamber and the outer peripheral chamber to communicate with the expansion side chamber;
   a pressure-side first passage and a pressure-side second passage that communicate between the large chamber and the pressure side chamber;

a first valve disposed in the pressure-side first passage, the first valve being configured to allow only a flow of liquid from the large chamber toward the pressure side chamber while providing resistance to the flow; and a second valve disposed in the pressure-side second passage, the second valve being configured to allow only a flow of liquid from the pressure side chamber toward the large chamber while providing resistance of the flow.

2. The shock absorber according to claim 1, wherein the first valve and the second valve are leaf valves.

3. The shock absorber according to claim 2, further comprising:

a valve disc coupled to the housing via a coupling rod, the valve disc being disposed inside the pressure side chamber; and a cap mounted on an outer periphery of the coupling rod, the cap fitting the valve disc to define a room inside the pressure side chamber, wherein the large chamber communicates with the room through a rod internal passage formed inside the coupling rod, the valve disc includes a first port and a second port that communicate between the room and the pressure side chamber, the pressure-side first passage is formed by the first port and the rod internal passage, the pressure-side second passage is formed by the second port and the rod internal passage, on a side of the pressure side chamber in the valve disc, the first valve is laminated, the first valve being configured to open and close the first port, and on a side of the room in the valve disc, the second valve is laminated, the second valve being configured to open and close the second port.

4. The shock absorber according to claim 2, further comprising a valve disc housed in a hollow portion disposed inside the housing, the valve disc partitioning the hollow portion into the large chamber and a room, the room communicating with the pressure side chamber, wherein the valve disc includes a first port and a second port that communicate between the room and the large chamber, the pressure-side first passage is formed by the first port, the pressure-side second passage is formed by the second port, on a side of the room in the valve disc, the first valve is laminated, the first valve being configured to open and close the first port, and on a side of the large chamber in the valve disc, the second valve is laminated, the second valve being configured to open and close the second port.

5. The shock absorber according to claim 1, further comprising:

an outer pipe disposed outside the cylinder; and an intermediate pipe disposed between the cylinder and the outer pipe, wherein the housing fits end portions of the cylinder and the intermediate pipe so as to form the reservoir between the intermediate pipe and the outer pipe, a gap between the cylinder and the intermediate pipe forms a discharge passage, the discharge passage causing the expansion side chamber to communicate with the reservoir, the damping force adjusting unit is disposed between the discharge passage and the reservoir, and the small chamber or the outer peripheral chamber communicates with the expansion side chamber through the discharge passage.

* * * * *